United States Patent [19]
Yamaura

[11] Patent Number: 5,857,185
[45] Date of Patent: Jan. 5, 1999

[54] METHOD AND SYSTEM FOR SEARCHING AND FOR PRESENTING THE SEARCH RESULTS IN AN ATTRIBUTE THAT CORRESPONDS TO THE RETRIEVED DOCUMENTS

[75] Inventor: Fukumi Yamaura, Kawasaki, Japan

[73] Assignee: Fuji Xerox Co., Ltd., Tokyo, Japan

[21] Appl. No.: 710,140

[22] Filed: Sep. 13, 1996

[30] Foreign Application Priority Data

Oct. 20, 1995 [JP] Japan ................................. 7-297429

[51] Int. Cl.⁶ ........................................ G06F 17/21
[52] U.S. Cl. ........................ 707/5; 707/3; 707/516; 707/529; 345/141
[58] Field of Search .................... 707/3, 5, 529, 707/516; 704/7; 345/141

[56] References Cited

U.S. PATENT DOCUMENTS

| | | | |
|---|---|---|---|
| 5,129,082 | 7/1992 | Tirfing et al. ................................. | 707/3 |
| 5,220,625 | 6/1993 | Hatakeyama et al. ................... | 345/347 |
| 5,457,794 | 10/1995 | Azumatani .................................. | 707/2 |
| 5,469,354 | 11/1995 | Hatakeyama et al. ...................... | 707/3 |
| 5,523,945 | 6/1996 | Satoh et al. ................................. | 704/9 |
| 5,600,835 | 2/1997 | Garland et al. .............................. | 707/5 |
| 5,606,690 | 2/1997 | Hunter et al. ............................... | 707/5 |
| 5,659,729 | 8/1997 | Nielsen ....................................... | 707/3 |
| 5,680,612 | 10/1997 | Asada et al. ............................. | 382/317 |

OTHER PUBLICATIONS

"Recent development in full text database applications", M. Negishi, Journal of Information Processing Society of Japan, vol. 33, No. 4, Apr. 1992, pp. 413–420.

"Database service at NACSIS: The National Center for Science Information Systems", M. Negishi, Journal of Information Processing Society of Japan, vol. 33, No. 10, Oct. 1992, pp. 1144–1153.

"Natural language processing in the field of information retrieval", H. Fujisawa and H. Kinukawa, Journal of Information Processing Society of Japan, vol. 34, No. 10, Oct. 1993, pp. 1259–1265.

*Primary Examiner*—Thomas G. Black
*Assistant Examiner*—Jean R. Homere
*Attorney, Agent, or Firm*—Oliff & Berridge, PLC

[57] ABSTRACT

The electronic document database searching system displays search results using a display attribute that corresponds to the attribute of the string in each original electronic document. The system also displays the search results using a display attribute that varies in accordance with the frequency of occurrence of the searched string in each original electronic document

13 Claims, 7 Drawing Sheets

METHOD AND SYSTEM FOR SEARCHING AND FOR PRESENTING THE SEARCH RESULTS IN AN ATTRIBUTE THAT CORRESPONDS TO THE RETRIEVED DOCUMENTS

BACKGROUND OF THE INVENTION

1. Field of the Invention

The present invention relates to a data search method and a data search system using thereof which conduct searching in an electronic document database or the like according to an index and in particular relates to a data search method and a data search system using thereof which output the result of searching an d display it in a mode showing its features.

2. Discussion of the Related Art

Databases related to the academic works, publications, newspapers or the like have various types such as an index database recording only the bibliographic items, an abstract database recording abstracts in addition to the bibliographic items, and a full text database recording the whole texts. Recently, the full text database has been widely used because of great store of information. Such state of using database is described in "Journal of Information Processing Society of Japan", Vol. 33, No. 4, April 1992, pp. 413–420 and the same, Vol. 33, No. 10, October 1992, pp. 1144–1153.

In searching in formation recorded in such database, the searching process can be quickly carried out by utilizing an index using a word (a string) contained in the information as a key. In particular, it can be said that it is indispensable for realizing search in the full text database in a practical process time to conduct searching according to the index.

Generally, the index describes a string (word) occurring in the document, and identification informations of the document containing the strings or identification informations of sub-documents constituting a document. As a result of searching in the plural documents (a group of documents), the identification informations of the documents containing the strings inputted for searching (for example, the names of the documents) are listed, and on the other hand, as a result of searching in a single document, the identification informations of the sub-documents containing the strings inputted for searching (for example, the page numbers) are listed, whereby the user is able to know which is the document or the sub-document containing the string inputted for searching (namely, the string as a searching index). Regarding the listed identification informations of the sub-documents, the content of text of the corresponding sub-document can be displayed in accordance with the user's instruction.

The frequency of occurrence of the string to be searched (in some cases, containing its synonyms) in each of the documents is helpful information for determining which document is optimum as a result of searching among the documents listed with their document names. Therefore, the frequency of occurrence is numerically displayed by the side of each of the listed document names, or the frequency of occurrence is displayed by a graph with the list of the document names.

As described above, in the search system simply displaying the identification informations of the documents or sub-documents in the list, it is difficult to determine for the user which document is optimum as the result of searching based on the display. In the case where the content of the text corresponding to the listed sub-document is displayed, determination of optimumness can be easily made based on the display. However, in this case, each and every content of the text must be displayed corresponding to each of the identification informations of a large number of listed sub-documents, which results in complex operations and a long process time.

In the case of attaching the frequency of occurrence of the searched string to the list, determination of optimumness is easily made with reference to the frequency of occurrence. However, if the numerals indicating frequency of occurrence is displayed by the sides of many listed documents, it is difficult for the user to visually recognize each value of frequency of occurrence, and besides, it is not very much effective in practice because a large number of numeric values indicating the frequency of occurrence must be compared with each other. In the case where the graph showing the frequencies of occurrence is displayed with the list of the document names, variation in frequencies of occurrence can be recognized at a glance. However, the space for displaying graph is required in the screen and thereby the space for the list of the document names which are most important is reduced, thus making it harder for the user to recognize the list.

SUMMARY OF THE INVENTION

The present invention has been made in view of the above circumstances and has an object to enable the display of a list of the result of searching in a mode whereby the user can recognize the optimumness at a glance and easily and quickly retrieve the desired document.

Therefore, it is also the object of the present invention to provide a data search method, a data search system and information processing system using the method, and a recording medium which records a computer program using the method.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a data search method comprises the steps of inputting a first string as a searching index, searching a second string according to the first string from a database storing at least one string, an attribute of said string and information related to the string, and displaying information in the database related to the second string with an attribute of the second string.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENTS

Figure 1:
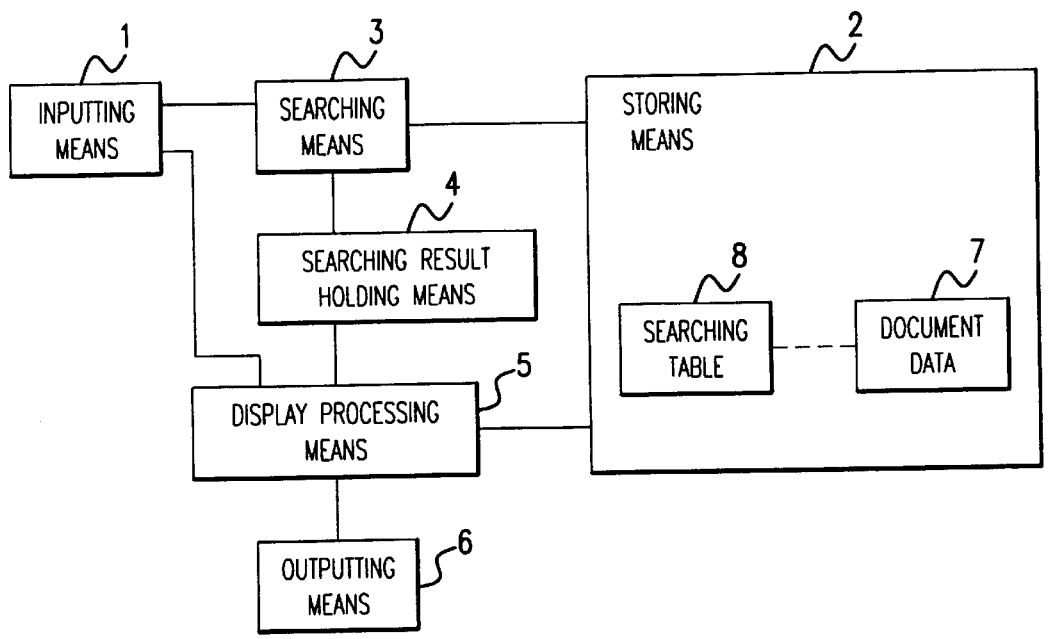
FIG. 1 shows a construction of a first embodiment of a data search system according to the present invention.

Recently, in the electronic document, as same as the paper documents such as books, many kinds of characters whose fonts (type faces) or sizes are different from each other are used appropriately in a single document. The use of many kinds of characters is carried out not only on purpose of visual effect, but related more to the importance of the part described in the document. For example, the character used in the title of the chapter or section (that is, the item name) is larger than those used in other parts of the documents, or an important word in its first occurrence is described by a font different from those of the other parts, such as gothic.

Consequently, in the case where the document containing the relevant string has been retrieved as a result of searching according to the searching index string, if the user is able to know what character type is used for describing the relevant string in the document from the displayed list of the document names, this will be a great help in selecting an optimum document name from the list.

When a document which was once referred to is to be retrieved, the user visually remembers a key string in many cases; therefore, the character type of the string is a clue to find the desired document.

The frequency of occurrence of the searching index string in each document is also a good clue to find the desired document in some display modes.

According to the present invention, the user can determine the optimumness from the list of the result of searching at a glance utilizing features related to description of the string in the document as described above.

Here, the search includes the case of searching by consulting a thesaurus dictionary for converting the first string into a synonym, as well as the case of searching by the exact match or substring match.

The information related to the second string is a conception containing the identifier or name of the document containing the second string, display of the portion in which the second string is located in the document (for example, title, item name or the like), position of the portion in which the second string is located (for example, the page number, the line number, the byte count from the start of sentence, or the like), and so forth.

The document is a conception which covers from a group of collected sentences describing a content to general publications such as books.

Attribute contains items such as whether there is a linear enclosure around the string or not, background color of the string or the like added to the features of character containing the size of the character, font, style, color of the character, whether there is any underline provided to the string, type of character such as a superior letter and an inferior letter, character width, and so forth.

"To display with the attribute of the second string" is a conception including the case of display with an attribute close to the attribute of the second string as well as the case of display with an attribute exactly the same as that of the second string in a database. For example, if it is assumed that the size of the character available for display is 6, 8, 10, 12, 14, 18 or 24 point and the attribute of the size of the second string in the database is 20 point, information regarding the second string is displayed with the character of 18 point.

The data search system of the present invention which executes the above-described data search method comprises string inputting means for inputting a first string as a searching index, storing means for storing strings in a document, attributes of the strings and information related to the strings, searching means for searching a second string according to the first string from the storing means, and display means for displaying the information related to the second string with the attribute of the second string stored in the storing means.

Here, information about the number of second strings contained in the document can be regarded as criterion for judging the importance of the second string in the document and is helpful in selecting an optimum document from the list showing the result of searching. Accordingly, in the data search system of the present invention, attribute of each of the second strings is extensively and entirely considered as a feature of the identical second strings in the document, and moreover, the frequency of occurrence of the second strings in the document is calculated by the computing means, and the information regarding the second string is displayed in a mode corresponding to the calculated frequency of occurrence by the display means.

The present invention can be implemented as an information processing system which conducts searching strings in the document recorded in the recording medium such as a CD-ROM or the like, attribute of strings and information about the strings. The information processing system is equipped with a printer which visualizes the document containing the second string in addition to a display for displaying information about the second string as a result of searching.

By making the information processing system equipped with the hardware such as CPU or RAM execute processing in accordance with a computer program, it is possible to carry out the data search related to the present invention described above.

According to the present invention described above, if the characters of the second string stored in the database or the like are, for example, thicker or in different style in comparison with other strings, the document name or item in the document containing the second string, or the second string itself is displayed in thick or different style as the result of searching similar to those stored in the database. Therefore, the user can understand at a glance with what attribute the second string hit by the searching index string (the first string) was described in the document based on some item names or the like displayed in the list as the result of searching, whereby it is possible to make quick determination which item name or the like is optimum as the result of searching from the list.

Such display of the list with different attributes is also carried out in accordance with the frequency of occurrence of the second string. In the case where the frequency of occurrence of the second string is criterion of optimum, the user can also determine which of item names or the like is optimum as the result of searching from the list quickly.

Preferred embodiments of a data search system according to the present invention are now described in detail based on the drawings.

First Embodiment

Represented as functional means as shown in FIG. 1, the data search system comprises inputting means 1 for inputting a first string as a searching index, storing means 2 for storing a database, searching means 3 for conducting search in the database stored in the storing means 2 according to the inputted first string, searching result holding means 4 for temporarily holding the result of searching conducted by the searching means 3, display processing means 5 for executing the display process in accordance with the result of searching, and outputting means 6 for outputting the displayed result of searching.

The database stored in the storing means 2 has document data 7 containing actual data of the document and a search table 8 containing indexes or the like which will be described later on with reference to FIG. 3.

Figure 2:
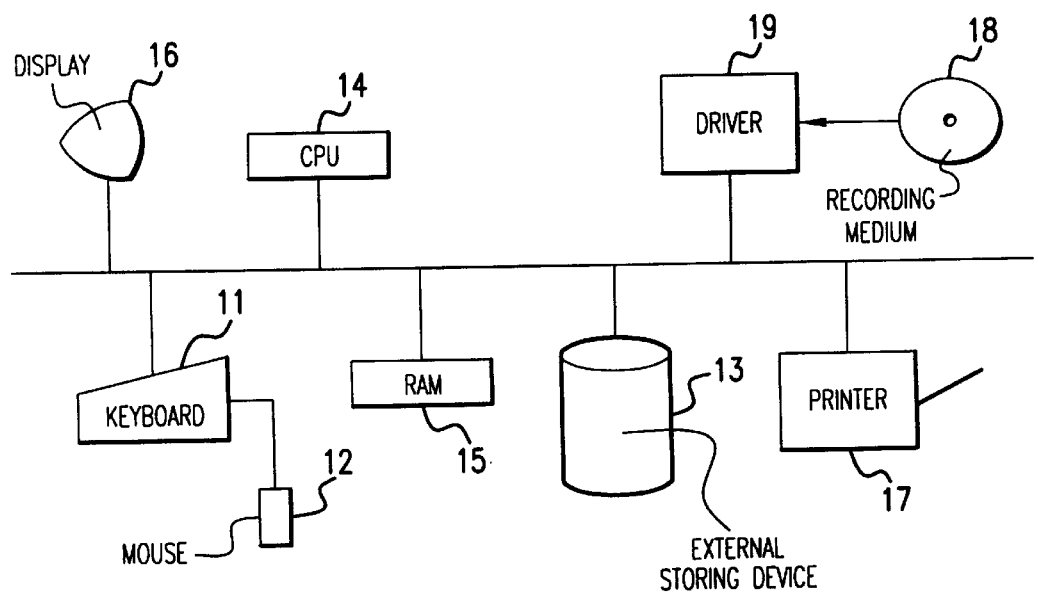
FIG. 2 shows a construction of a computer hardware implementing the first embodiment of the data search system according to the present invention.

The above-described data search system is implemented by an information processing system (a computer) having hardware resources as shown in FIG. 2, wherein the inputting means 1 includes a keyboard 11 or a mouse 12, the storing means 2 includes an external storing device 13 such as a magnetic disk device, the searching means 3 and the display processing means 5 includes a CPU (a processor) 14 executing the computer program and a RAM (an internal memory) 15, the searching result holding means 4 includes the RAM 15, and the outputting means 6 includes a display 16 or a printer 17.

The computer program describing a data search method related to the present invention is recorded in the recording medium 18 such as a floppy disk or a CD-ROM, and the computer program is read by a driver 19 and processed by the CPU 14.

That is, the recording medium 18 records the computer program including an input detecting step for detecting the input of the first string from the inputting means 1, a searching step for searching the inputted first string by the searching means 3 from the searching table 8 storing the second string in the document, attribute of the second string and information regarding the second string as described later, and a displaying step for displaying information regarding the second string in the table 8 with an attribute corresponding to the attribute of the second string, where the second string is searched by the searching means 3 according to the first string.

Figure 3:
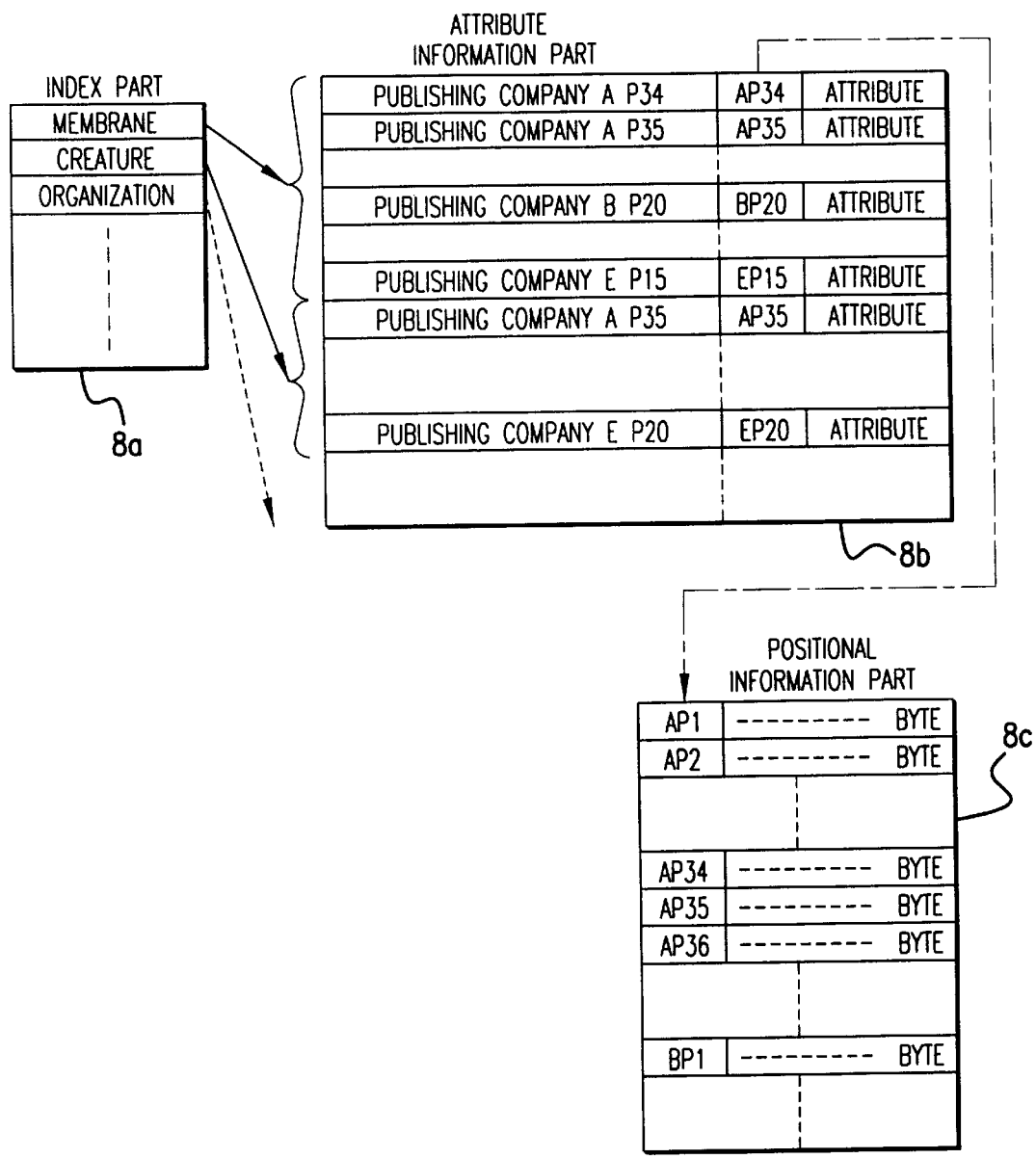
FIG. 3 shows a conception of contents stored in a search table of the first embodiment of the data search system according to the present invention.

As shown in FIG. 3, the search table 8 comprises an index part 8a, an attribute information part 8b and a positional information part 8c.

In the index part 8a, words as the second strings extracted from each of the documents stored in the document data 7: in the example of the figure, the strings of words such as "membrane", "creature", "organization" and so forth are stored.

The attribute information part 8b stores the display information about in which portion of each document stored in the document data 7 the second string is contained, and the attribute information about what the mode of the second string in the portion is: that is, the publishing company's name and the page number indicating the document and the portion, respectively, attributes such as the size of the second string in the portion, and a pointer to the positional information part 8c are stored. For example, the attribute information part 8b shows the information related to the string "membrane" in the index part 8a as follows: described in p. 34 in a publication published by A with the attribute of normal character size in the document; described in p. 35 in a publication published by A with the attribute of character size larger than usual; described in p. 20 in a publication published by B with the attribute of character size larger than usual; and described in p. 15 in a publication published by E with the attribute of normal character size in the document.

In the positional information part 8c, the positional information of the portion (page) containing the second string is stored, that is, the byte count from the starting character of the document to the starting character in each page of every document identified by the name of the publishing company. Each of these positional information is connected to the attribute information part 8b by the pointer. For example, the page 34 in the publication published by A is connected by the pointer "AP34" to the positional information (the byte count) stored in the positional information part 8c.

Figure 4:
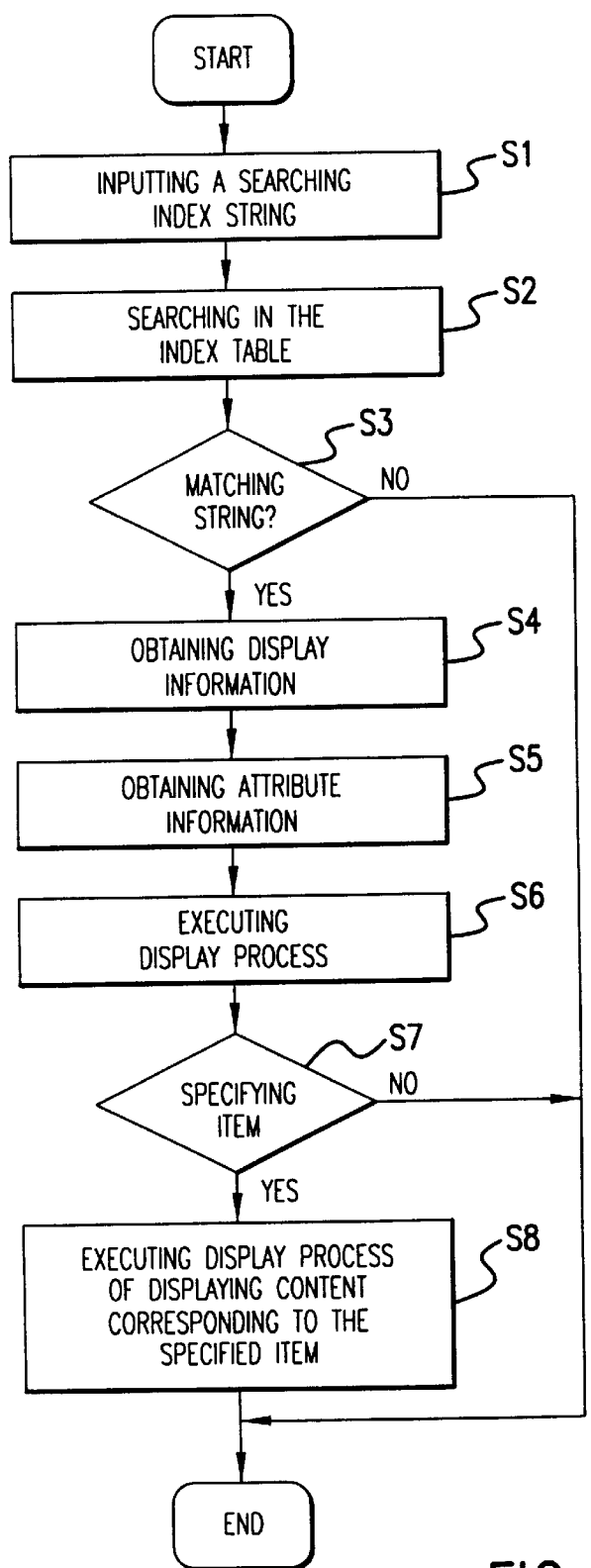
FIG. 4 is a flow chart showing procedures of searching process in the first embodiment of the data search system according to the present invention.
Figure 5:
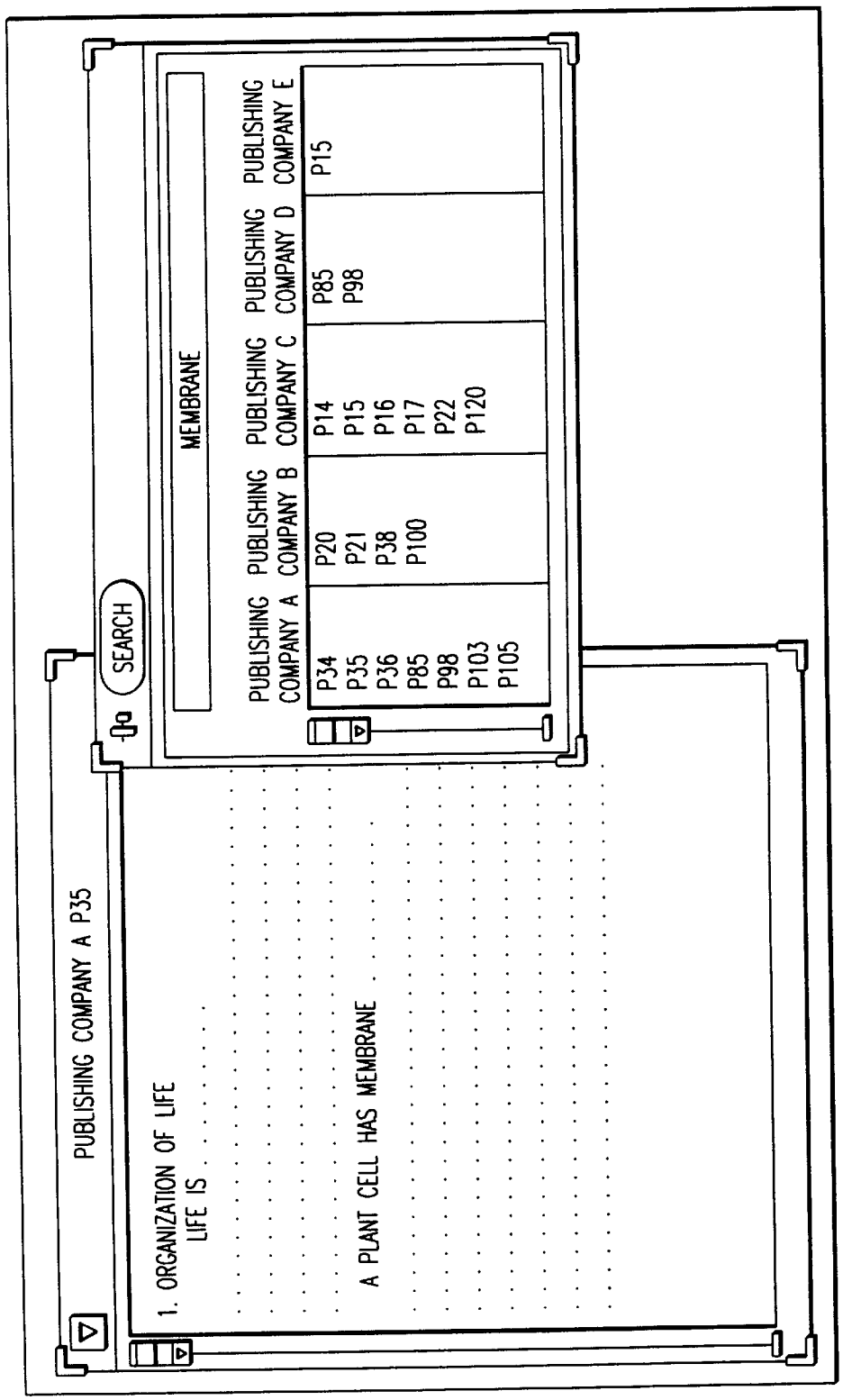
FIG. 5 shows an example of display mode of a result of searching.

With the data search system of the above-described construction, the searching process is carried out in accordance with procedure shown in FIG. 4 and the result of searching is outputted as shown in FIG. 5.

As the first string as a searching index is inputted by the inputting means 1 (step 1), the searching means 3 conducts searching in the searching table 8 stored in the storing means 2 (step 2) and determines whether a string corresponding to the inputted first string exists in the index part 8a (step 3). For example, if the string "membrane" is inputted as the first string, the searching means 3 determines whether the string "membrane" exists in the index part 8a or not.

As a result of the above determination, if it turned out that there is no corresponding string in the index part 8a, the processing is terminated because no document having the inputted first string as a key exists in the database.

If the corresponding string exists in the index part 8a, the searching means 3 obtains the display information and attribute information corresponding to the inputted first string from the attribute information part 8b (steps 4 and 5), and stores the information in the searching result holding means 4. For example, corresponding to the first string "membrane", the display information connected to the string "membrane" in the index part 8a, such as "Publishing company A, p. 34", "Publishing company A, p. 35", "Publishing company B. p. 20", or "Publishing company E, p. 15", and the attribute information recorded in the attribute information part 8b in connection with each of these display information are read and stored in the searching result holding means 4. The pointer to the positional information part 8c is also read with the information and stored in the searching result holding means 4.

As the searched information is stored in the searching result holding means 4 as described above, the display processing means 5 executes the display process (step 6) to display the list of result of searching on the screen of the display 16, in which the display information is represented in accordance with their attributes as shown in "search" window in FIG. 5.

In this example, it is displayed in the list that the string "membrane" is contained in pages 34, 35, 36, 85, 98, 103 and 105 (P34, P35, P36, P85, P98, P103, and P105) of the publication by Publishing company A, in pages 20, 21, . . . (P20, P21, . . . ) of the publication by Publishing company B, . . . , with the attributes corresponding to the descriptive attribute of the string "membrane" in these pages.

That is, in pages 35 and 105 of publication by Publishing company A, and in page 20 of publication by Publishing company B or the like, the size of the characters in the string "membrane" are larger than the other characters; therefore, the information related to the string "membrane" such as P35 and P105 in the column of Publishing company A and P20 in the column of Publishing company B are described by characters of larger size which is the same as that of the string "membrane" itself. To the contrary, in page 103 of publication by Publishing company A and in page 22 of publication by Publishing company C, the size of the characters in the string "membrane" are smaller than the other characters; accordingly, the information related to the string "membrane" such as in P103 in the column of Publishing company A and P22 in the column of Publishing company C are described by characters of smaller size which is the same as that of the string "membrane" itself.

Consequently, the user can easily understand in what mode, in which portion of what document the string "membrane" is described only according to the list, and based on the descriptive feature of characters of the string, the user can determine which portion of what document is optimum as a result of searching with ease.

The user then carries out selecting operation through the inputting means 1 to select and specify an item from the list displayed (step 7), and according thereto, the display processing means 5 executes the process of displaying the contents of the document corresponding to the specified item in the display 16 (step 8). That is, the display processing means 5 traverses the pointer regarding the specified item among the pointers held in the searching result holding means 4, obtains the corresponding positional information (the byte count) from the positional information part 8c, reads the content of the corresponding page of the corresponding document from the document data 7, and thus displays it on the screen of the display 16. For example, as shown in FIG. 5, if P35 of publication by Publishing company A is selected from the items in the displayed list to be specified, the content of the corresponding page is displayed in a window, in which the string "membrane" is described with characters larger than the other characters.

The content of the relevant page or the content of the relevant document as a whole may be printed and outputted by the printer 17 in accordance with the above instruction of selection.

Figure 6:
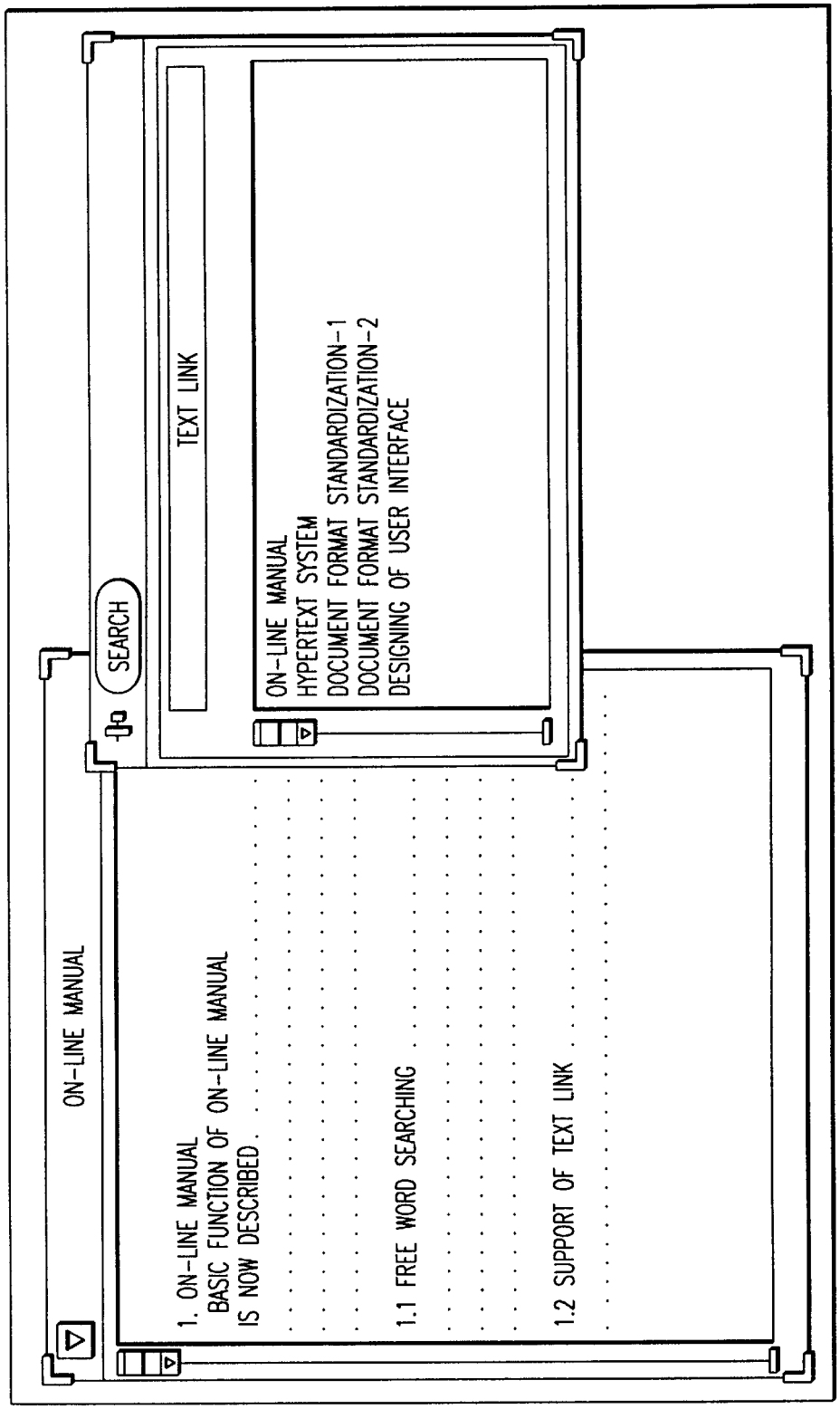
FIG. 6 shows another example of display mode of the result of searching.

FIG. 6 shows another example of a display mode of the data search system according to the present invention.

This example is different from the indexing method explained by the above example in which the searching process is carried out using the index table 8: the searching process is executed using a scanning method which directly scans all of the contents (text) of the documents stored in the document data 7 and examines whether the inputted first string exists or not. That is, this example conducts the display of the list showing the result of searching by obtaining the attribute information (font, character size, style or the like) attached to the content of the text of the document from the document data 7, not by preparing the search table 8 and obtaining the attribute information therefrom.

The constituents of this example are the same as those of the preceding example except for the constituent related to the search table 8, and to be more concrete, this is to display the title of the chapter in the technical report containing the searching index string as the result of searching.

As the first string to be searched is inputted by the inputting means 1, the searching means 3 searches the document data 7 stored in the storing means 2, that is, scanning is made for examining whether the string corresponding to the first string exists or not. If the corresponding string exists, the searching means 3 obtains the attribute information attached to the string and title of the chapter containing the string, and stores these information in the searching result holding means 4.

As the searched information is stored in the searching result holding means 4, the display processing means 5 executes the display process to display the titles of chapters in a list of searching result in the screen of the display 16 according to attributes of strings contained in the relevant chapters as shown in "search" window in FIG. 6.

FIG. 6 shows result of searching utilizing the first string "text link" as an example, in which titles of chapters in the technical report containing the string "text link", such as "on-line manual", "hypertext system", and so forth are displayed in the list with the same attribute as the descriptive attribute of the string "text link" in the chapters.

For example, the title "on-line manual" of a chapter, in which "text link" is described by characters larger than other characters in the document as a subtitle (e.g., 14-point gothic character), is described by characters which are the same as those of "text link" (e.g., 14-point gothic characters) in the displayed list, and the title "hyper text system" of a chapter, in which "text link" is described by characters of the normal size (e.g., 12-point Ming-style character) in the document as the descriptive portion, is described by characters which are the same as those of "text link" (e.g., 12-point Ming-style character) in the displayed list.

This enables the user to easily understand in what mode, in which chapter of what document the string "text link" is described only at a glance over the displayed list and determine which chapter of the document is optimum as the searching result in accordance with the descriptive mode of these strings.

In this example, the content of the specified chapter in the document can also be displayed and outputted by selecting and specifying the title from the displayed list.

Second Embodiment

Figure 7:
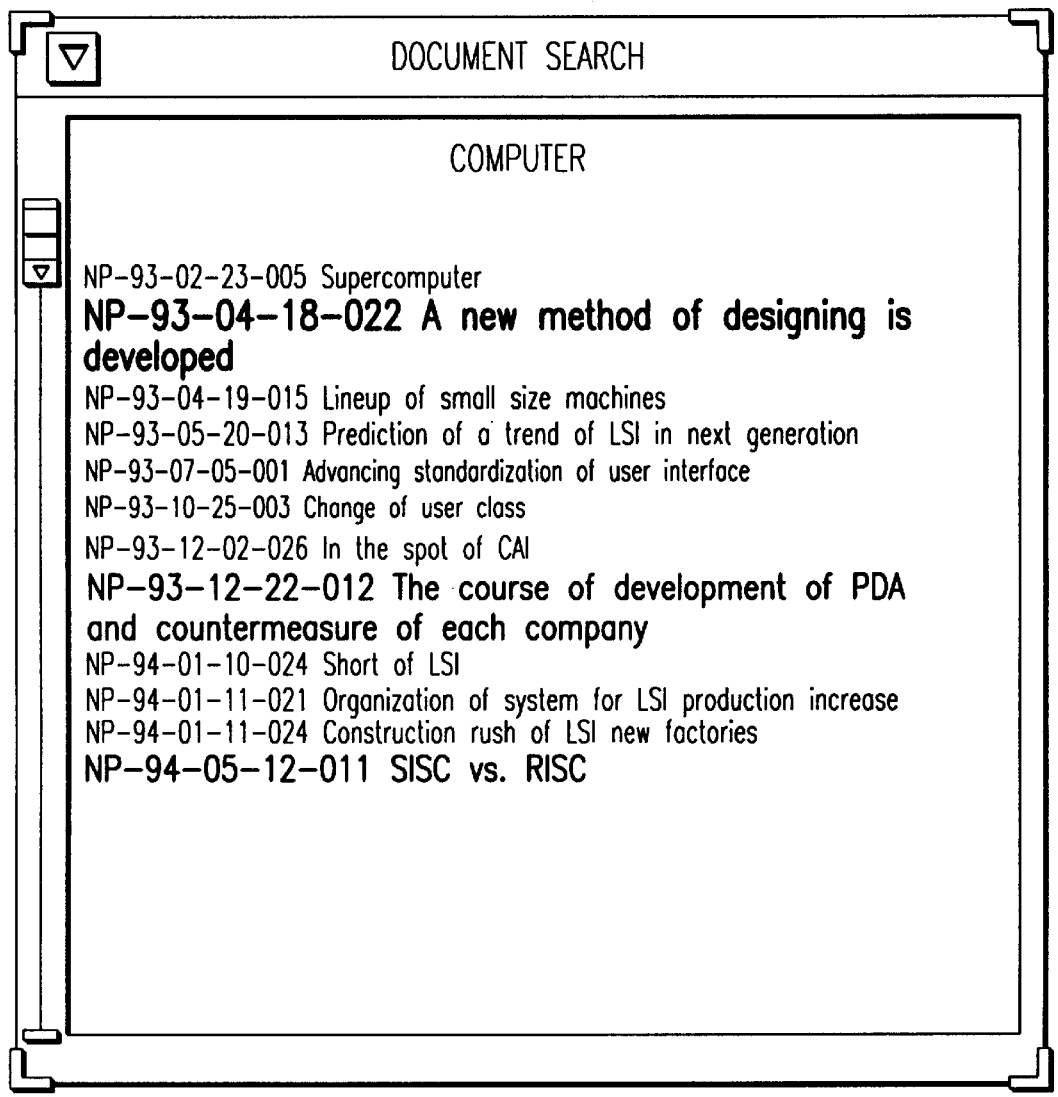
FIG. 7 shows an example of display mode of a result of searching in a second embodiment of the data search system according to the present invention.

FIG. 7 shows a display mode of a second embodiment of the data search system according to the present invention.

Figure 8:
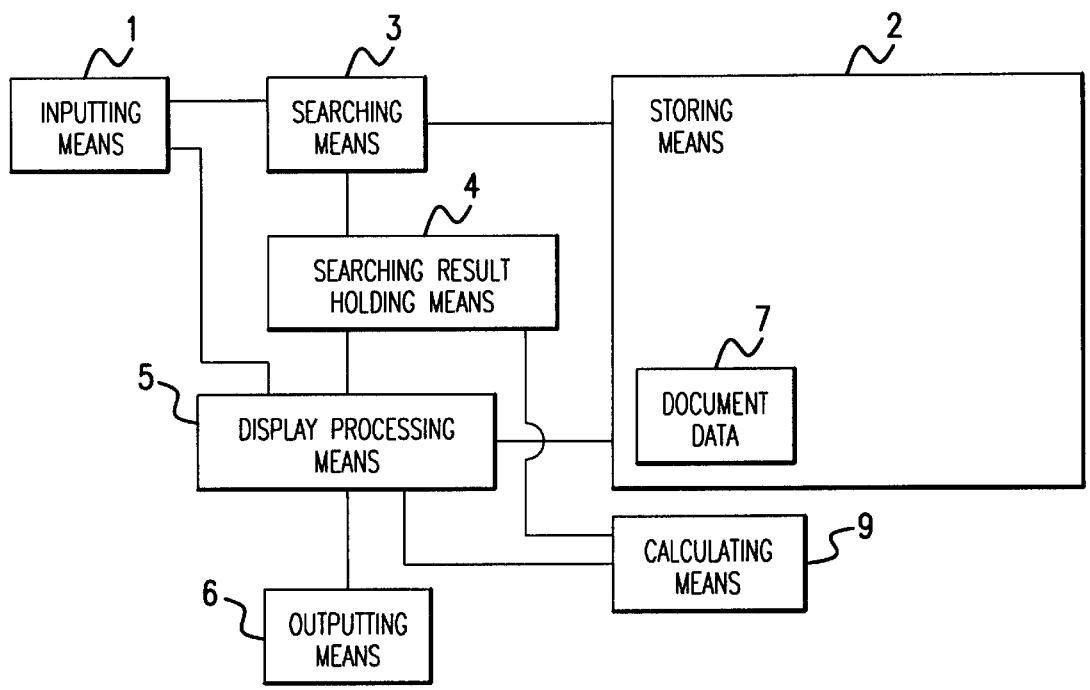
FIG. 8 shows a construction of the second embodiment of the data search system according to the present invention.

This example executes the searching process by carrying out the scanning method same as the above-example on the articles of newspapers stored in the document data 7, which calculates the frequency of occurrence of the inputted first string in the articles of newspapers and displays the titles of newspapers containing the first string in the mode corresponding to the calculated frequency of occurrence in the list. Therefore, as shown in FIG. 8, the data search system of this example is equipped with calculating means 9 which calculates the frequency of occurrence of the first string based on the result of searching conducted by the searching means 3, and accordingly, the display processing means 5 carries out the process of displaying the searching result in the mode determined by the calculating means 9 based on the result of calculation. The titles of newspapers are displayed in the mode corresponding to the result of calculation, for example, in the case where the frequency of occurrence of the string to be searched is 20 or more, the display is made by 18-point characters, in the case where the frequency is 10 or more, the display is made by the 14-point characters, in the case where the frequency is 3 or more, the display is made by 12-point characters, and in the case where the frequency is less than 3, the display is made by 10-point characters.

As the first string to be searched is inputted by the inputting means 1, the searching means 3 conducts searching in the document data 7 stored in the storing means 2 to scan for examining whether a string corresponding to the first string exists or not, and obtains the article in which the corresponding string exists, together with its title, and stores them in the searching result holding means 4.

The calculating means 9 calculates the number of strings corresponding to the first string in the articles held in the searching result holding means 4, and assigns mode information of character in accordance with the calculated number of strings to the title of each article. The display processing means 5 conducts the display process in accordance with the processing result by the calculating means 9, and as shown in FIG. 7, the titles of the articles of newspapers are displayed in the list on the screen of the display 16 by characters of the size according to the number of strings contained in the title portion.

FIG. 7 shows an example of result of searching utilizing the first string "computer", in which the titles of articles in newspapers containing the string "computer", such as "NP-93-02-23-005 Supercomputer", "NP-93-04-18-022. A new method of designing is developed", . . . are displayed in the list in the character mode corresponding to the frequency of occurrence of the string "computer" in those articles. For example, the title "NP-93-04-18-022 A new method of designing is developed" of the article containing 20 or more strings of "computer" is displayed by 18-point characters, the title "NP-93-02-23-005 Supercomputer" of the article containing 3 or more and less than 10 strings is displayed by 14-point characters, and the title "NP-93-07-05-001 Advancing standardization of user interface" of the article containing less than 3 strings is displayed by 12-point characters.

Thereby the user can easily understand in which title portion of the newspaper and how frequently the string "computer" is used at a glance of the displayed list, and can determine which title portion of the newspaper is optimum to be obtained as the result of searching.

The frequency of occurrence can be represented by variation of color of characters. For example, the colors may be allotted to the characters so that the title of high occurrence frequency is represented by red characters, and the color of characters gradually varies to be blue in order as the occurrence frequency is reduced. According to the method, it is possible to represent the frequency of occurrence with variation which is wider than in the case where the frequency of occurrence is represented by the size of characters.

Figure 9:
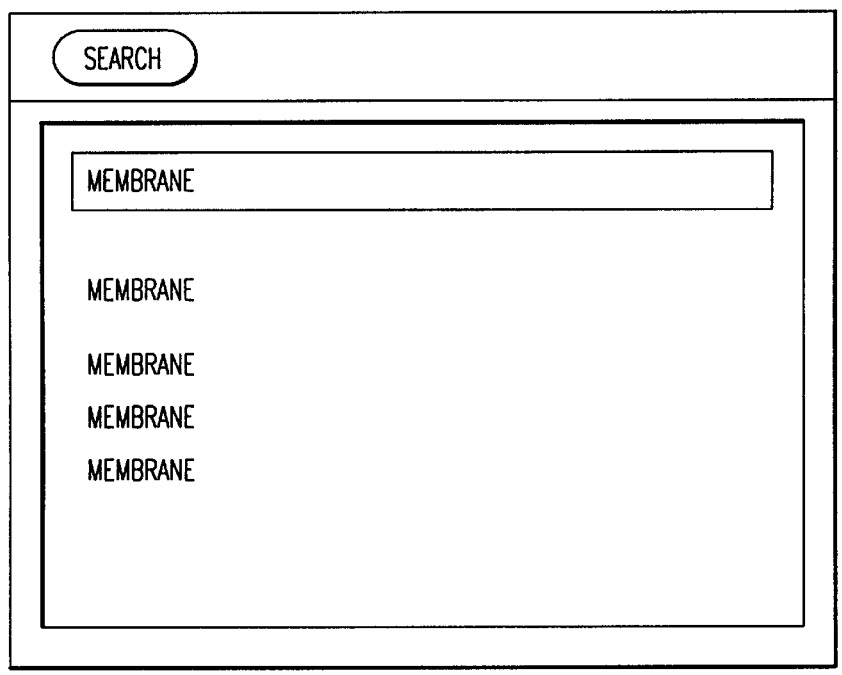
FIG. 9 shows another example of display mode of the result of searching.

FIG. 9 shows another example of a display mode of the data search system according to the present invention.

This embodiment is the same as the first embodiment described with reference to FIGS. 1–5, except that the corresponding strings themselves are displayed in the list with the same attributes as those described in the document instead of displaying the result of searching as the information related to the string (namely, the portion of the document containing the string). In this example, the display information stored in the attribute information part 8b (Publishing company A, P34, and so forth) is not used; therefore, the searching process can be carried out not only by the indexing method but also by the scanning method.

In the indexing method, as the first string is inputted by the inputting means 1, the searching means 3 carries out searching in the table 8 stored in the storing means 2 to examine whether the string corresponding to the inputted first string exists in the index part 8a. If the corresponding string exists in the index part 8a, the searching means 3 obtains the portion of the document in which the string exists and the attribute information of the corresponding string from the attribute information part 8b and stores it in the searching result holding means 4. For example, corresponding to the first string "membrane", portions of the document such as Publishing company A p. 34, Publishing company A p. 35, Publishing company B p. 20, Publishing company E p. 15, and so on, and attribute information are read and stored in the searching result holding means 4. As the searched information is stored in the searching result holding means 4, the display processing means 5 carries out the display processing and the strings "membrane" are displayed in the list in the modes in accordance with the respective attributes on the screen of the display 16.

In the scanning method, based on the inputted first string, the searching means 3 directly executes searching in the document data 7 stored in the storing means 2 to conduct scanning for examining whether the string corresponding to the first string exists or not. If the corresponding string exists, the attributes accompanying the string are obtained and stored in the searching result holding means 4. As the searched information is stored in the searching result holding means 4, the display processing means 5 carries out the display process, whereby the strings "membrane" in the modes according to the respective attributes are displayed in the list on the screen of the display 16.

Accordingly, the user can easily understand in what mode the string "membrane" in the document data 7 is described only at a glance of the displayed list; thereby he/she can easily make determination in what degree of importance the string "membrane" is described in the document.

As an arbitrary string "membrane" is selected from those displayed in the list with different display modes based on the above determination, contents such as the page of the document or the title portion connected to the string by the table 8 are displayed in the window. Consequently, the user can determine optimumness of the portion of the document containing the string "membrane" as the searching result based on the displayed list of the strings "membrane", and accordingly, he/she can quickly find the desired document portion without displaying the contents of a large number of document portions in the window.

In the above-described example, pages or titles of the document containing the strings to be searched are displayed in the list. However, the invention is not limited thereto, and the document name containing strings to be searched, the reference title containing strings to be searched, and the positions of strings to be searched in the document can be displayed in the list with the attributes corresponding to those of strings in the document.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data search method comprising the steps of:
   inputting a first string as a searching index;
   searching a second string according to said first string from a database storing at least one string, display attribute data of said string and information related to said string; and
   displaying information in said database related to said second string with a display attribute of said second string using said display attribute data stored in said database for said second string.

2. A data search system comprising:

string inputting means for inputting a first string as a searching index;

storing means for storing at least one string in a document, display attribute data of said string and information related to said string;

searching means for finding a second string according to said first string from said strings stored in said storing means; and display means for displaying information related to said second string with a display attribute of said second string using said display attribute data stored in said storing means for said second string.

3. The data search system according to claim 2, wherein said attribute of said string stored in said storing means includes a feature of a character of said string.

4. The data search system according to claim 2, wherein said information related to said string stored in said storing means includes a title of a document containing said string, and said display means displays a title of a document containing said second string stored in said storing means as said information related to said second string in said storing means.

5. The data search system according to claim 2, wherein said information related to said string stored in said storing means includes an item name containing said string, and said display means displays an item name containing said second string as said information related to said second string in said storing means.

6. The data search system according to claim 2, wherein said information related to said string stored in said storing means includes a position of said string in said document, and said display means displays a position of said second string as said information related to said second string stored in said storing means.

7. A data search system comprising:

string inputting means for inputting a first string as a searching index;

storing means for storing at least one string in a document and display attribute data of said string;

searching means for finding a second string according to said first string from said storing means;

and display means for displaying said second string stored in said storing means with a display attribute of said second string using said display attribute data stored in said storing means for said second string.

8. The data search system according to claim 7, wherein said attribute data of said display string stored in said storing means includes a feature of a character of said string.

9. An information processing system comprising:

string inputting means for inputting a first string as a searching index;

storing medium for storing at least one string in a document, display attribute data of said string and information related to said string;

searching means for finding a second string according to said first string from said storing medium;

a display for displaying information stored in said storing medium related to a second string searched according to said first string with a display attribute of said second string using said display attribute data stored in said storing means for said second string;

a printer for visualizing a document containing said second string in said storing medium.

10. The information processing system according to claim 9, wherein said strings in said storing medium are all of the words contained in said document.

11. A data search system comprising:

string inputting means for inputting a first string as a searching index;

storing means for storing at least one string and information related to said string;

searching means for searching said storing means according to said first string;

calculating means for calculating the number of second strings found according to said first string by said searching means; and display means for displaying information related to said searched second string by a feature of character corresponding to said number of said second strings calculated by said calculating means.

12. A recording medium readable by a computer, said recording medium storing a program for making said computer execute a searching process according to a program including instructions for executing the following processes of:

(a) detecting an input of a first string as a searching index;

(b) searching a database storing at least one string in a document, a display attribute data of said string, and information related to said string, according to said first string; and (c) displaying information in said database related to a second string searched according to said first string with a display attribute of said second string using said display attribute data stored in said database for said second string.

13. An information processing system comprising:

inputting means for inputting a first string as a searching index;

a database for storing at least one string in a document, a display attribute data of said string and information related to said string;

a recording medium for storing a computer program;

a driver for reading said computer program from said recording medium recording thereof, a RAM for storing said computer program read by said driver;

a CPU for executing said computer program stored in said RAM; and a display for displaying a result of searching according to said computer program executed by said CPU, wherein said computer program comprises the processes of:

(a) detecting an input of said first string as a searching index;

(b) searching said database according to said first string; and (c) displaying information stored in said database related to a second string with a display attribute of said second string using said display attribute data stored in said database for said second string.

* * * * *